(12) United States Patent
Hass et al.

(10) Patent No.: US 7,441,320 B2
(45) Date of Patent: Oct. 28, 2008

(54) METHOD OF VALIDATING MANUFACTURING CONFIGURATIONS DURING HARDWARE ASSEMBLY

(75) Inventors: Kenneth Hass, Wichita, KS (US); Antoine Habashy, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 346 days.

(21) Appl. No.: 10/966,861

(22) Filed: Oct. 15, 2004

(65) Prior Publication Data
US 2006/0085087 A1 Apr. 20, 2006

(51) Int. Cl.
*G01R 31/28* (2006.01)
(52) U.S. Cl. .................. 29/593; 29/592.1; 29/602.1; 340/568.1; 360/97.01; 360/98.01; 700/95
(58) Field of Classification Search .............. 29/592.1, 29/593, 602.1; 340/568.1; 360/97.01, 98.01; 700/95
See application file for complete search history.

(56) References Cited

U.S. PATENT DOCUMENTS 4,001,650 A * 1/1977 Romain ...................... 361/106
5,832,372 A * 11/1998 Clelland et al. .......... 455/115.2
5,975,081 A * 11/1999 Hood et al. ................. 128/845
2003/0074098 A1* 4/2003 Cheung et al. .............. 700/121

* cited by examiner

*Primary Examiner*—Paul D Kim
(74) *Attorney, Agent, or Firm*—Suiter Swantz PC LLO

(57) ABSTRACT

The present invention is a method and system for manufacturing an electronic device, such as a data storage device. The method includes generating a register including a desired device configuration. The register may include an identifier and radio signal information associated with the component so that the component may be tracked via a radio frequency identification device (RFID) physically associated with the component. Radio signals are monitored for signals associated with the component such as prior to inclusion into the electronic device to prevent improper assembly. An alert may be provided if a radio signal associated with a component included in the desired configuration is not present. The radio signals determined during monitoring are verified with the radio signals associated with the components included in the register. The components are assembled into the electronic device (or partially assembled device). The radio signal(s) are monitored to ensure the components were actually incorporated into the electronic device prior to proceeding with additional production.

21 Claims, 3 Drawing Sheets

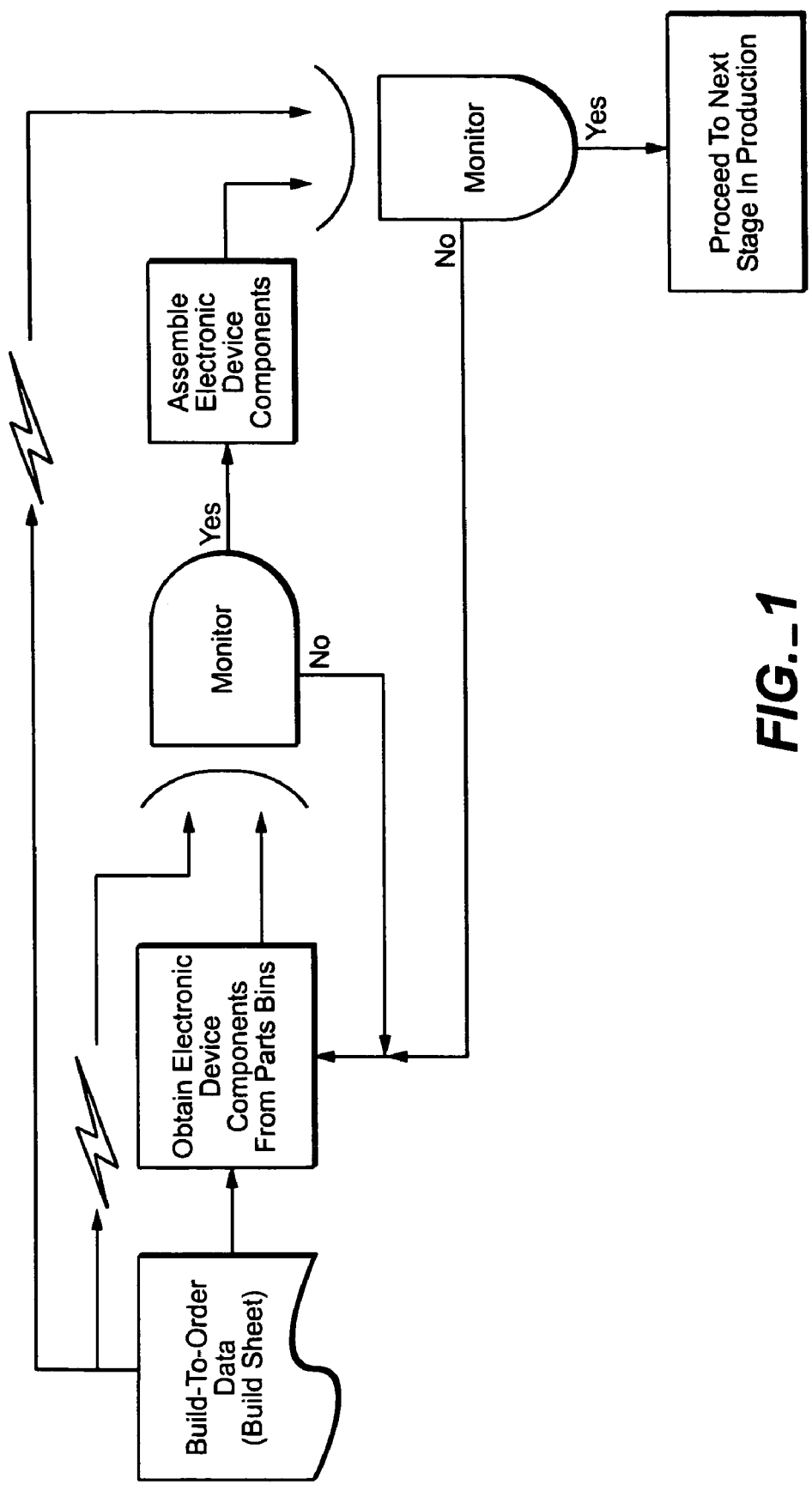
FIG._1

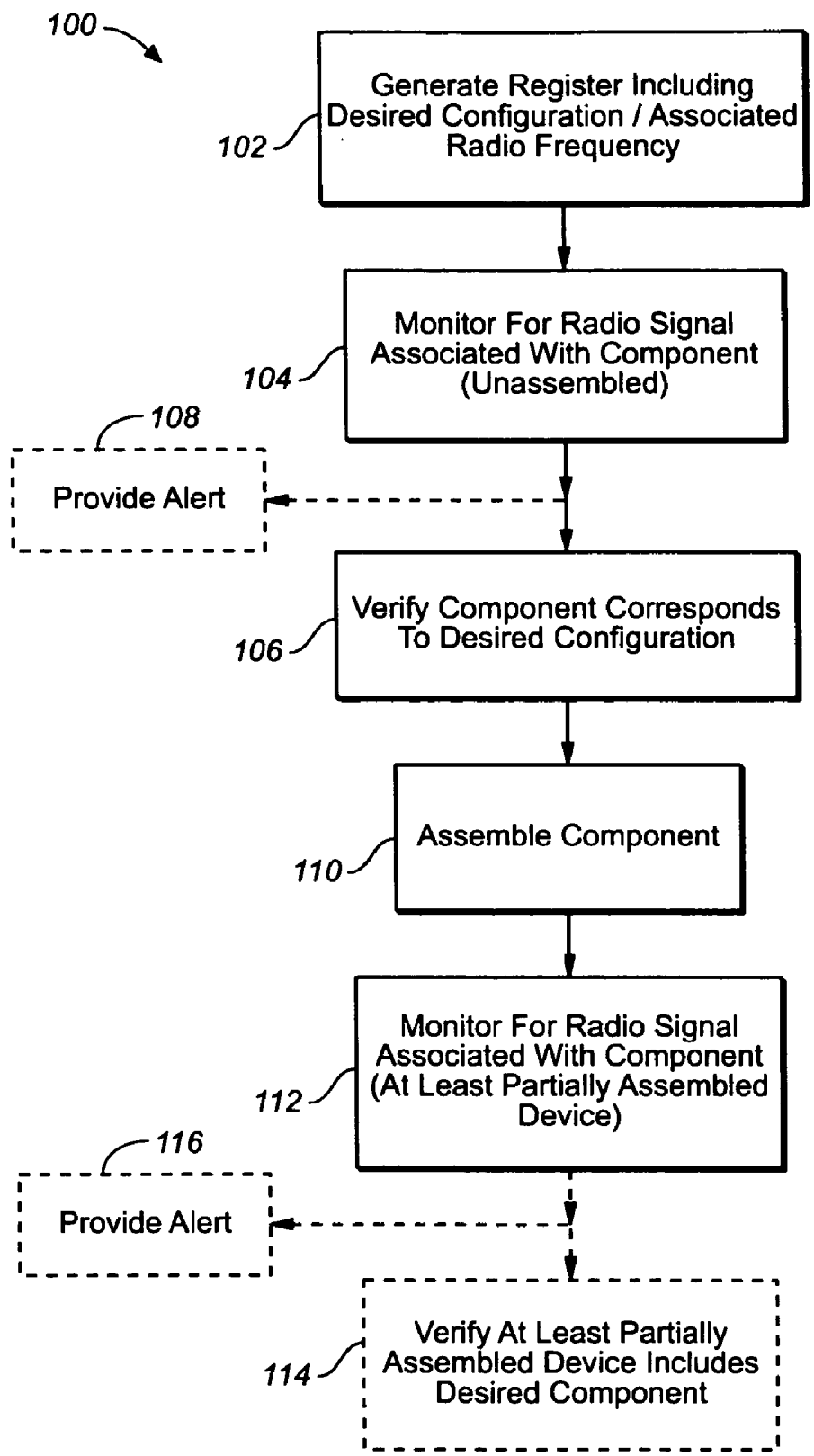
FIG._2

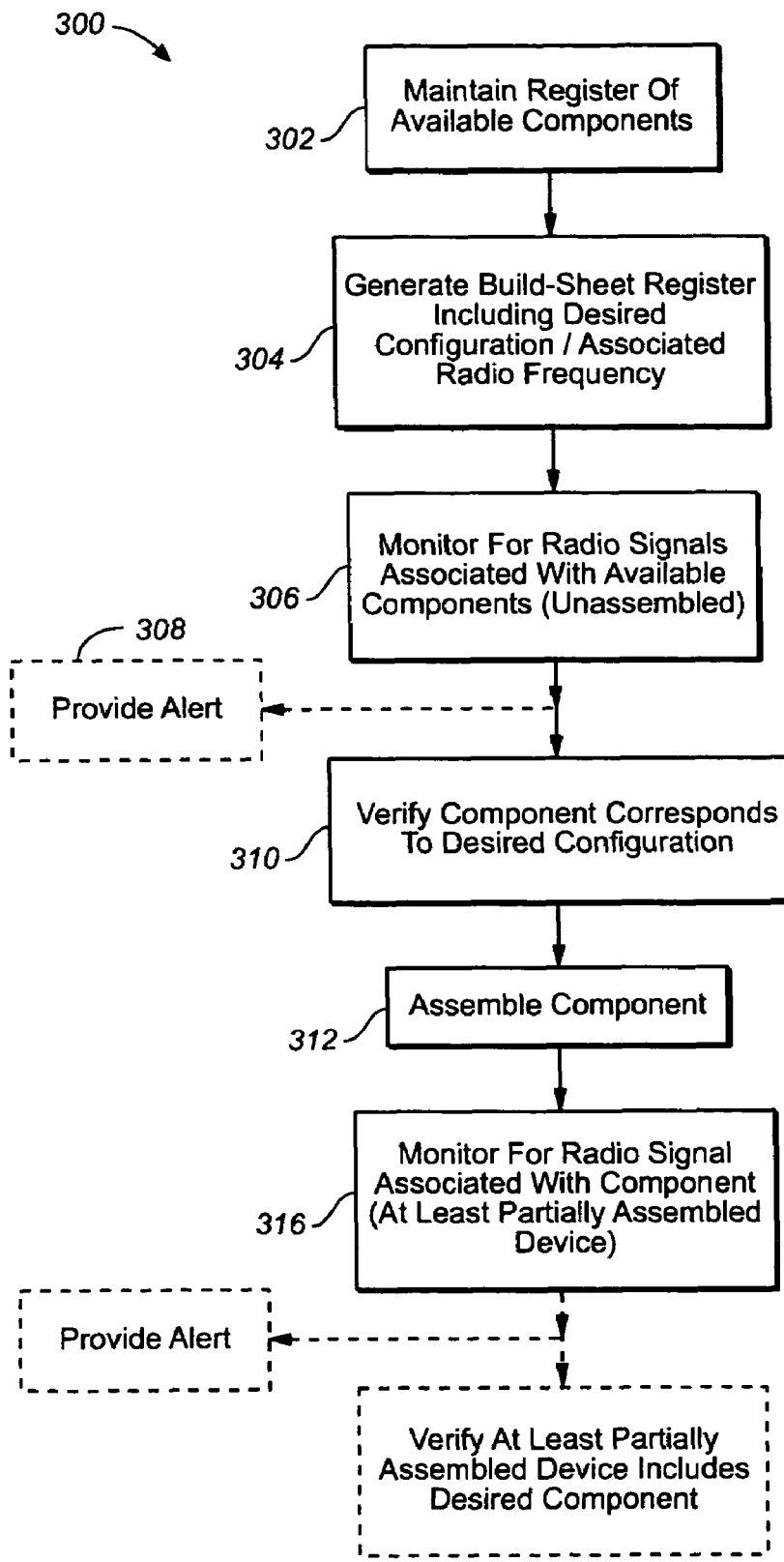
FIG._3

METHOD OF VALIDATING MANUFACTURING CONFIGURATIONS DURING HARDWARE ASSEMBLY

FIELD OF THE INVENTION

The present invention relates to the field of electronics manufacturing, and particularly to a method for validating a manufacturing configuration during manufacture.

BACKGROUND OF THE INVENTION

Electronics manufacturing, and in particular data storage device and computer manufacturing, involves integrating multiple components into a finished system. Manufacturers typically offer customers either a customized device such as a data storage system, which is built to a client's specification, or offer several different component combinations to accommodate a group of clients' preferences (i.e., clients data storage needs including redundancy, controller specifications, clients data storage capacity demands, and the like). For example, during manufacturing a wide variety of components such as controllers with varying chipsets, hard drives having different capacities, various communication cards and the like are selected for integration into a system. Verifying the correct combination of components may be difficult and time consuming. During manufacture, components to be integrated into a system are compared to a build sheet corresponding to a system configuration to be assembled to verify the proper components are included into the system.

Presently, components are stored in groups (e.g., all controllers having a first chipset are stored together, while controllers having a second chipset are stored together, and the like). As a result, employees must visually inspect the component to ensure the component corresponds to the component specified in the build sheet, or an optical scanner may be utilized to scan a barcode label (which identifies the component) to ensure the proper configuration is assembled. Improper component integration may result in customer complaints or in devices which have a more expensive component (greater functionality) than the component which was to be included. As a result, an assembled system may be sold for less than is desired for a system having the included component. In addition, improper component assembly may impact manufacturing efficiency due to inventory errors.

Therefore, it would be desirable to provide a method and system for providing for validating a manufacturing configuration during manufacture.

SUMMARY OF THE INVENTION

Accordingly, the present invention is directed to a method and system for validating a manufacturing configuration. The method of the present invention may be implemented to prevent/minimize incorrect electronic device manufacture and in-particular to prevent continued assembly of an electronic device having an improper component or an omitted desired component.

In a first aspect of the invention, a method for manufacturing an electronic device, such as a data storage device, an information handling system, or the like, is disclosed. The method includes generating a register including a desired device configuration. The generated register may include a variety of data associated with the components to be included. For example, the register may include an identifier (i.e., a part number) and radio signal information associated with the component or components so that the component may be tracked via a radio frequency identification device (RFID) physically associated with the component. Radio signals are monitored for signals associated with the component prior to inclusion into the electronic device to minimize the possibility of improper assembly. An alert may be provided if a radio signal associated with a component included in the desired configuration is not present. The radio signals determined during monitoring are verified with the radio signals associated with the components included in the register. The components are assembled into the electronic device (or partially assembled device). The radio signal(s) are monitored to ensure the components were actually incorporated into the electronic device prior to proceeding with additional production.

In a further aspect of the invention, a method of manufacturing an electronic device includes the step of maintaining a register of available components which may be included in the device. Maintaining an available components register may permit identification of additional components not included in a desired component configuration. The method includes generating a build-sheet register including a desired device configuration including components selected from the available component register. The generated register may include a variety of data associated with the components to be included. The build-sheet register may include an identifier (i.e., a part number) and radio signal information associated with the component or components so that the component may be tracked via a radio frequency identification device (RFID) physically associated with the component. Those of skill in the art will appreciate that the build-sheet register may be a separately maintained database, be formed as a sub-register of the available component register or the like. Radio signals corresponding to the available components are monitored for signals associated with the components such as prior to inclusion into the electronic device to minimize the possibility of improper assembly. An alert may be provided if a radio signal associated with a component included in the desired configuration is not present, additional components are present or the like. The radio signals determined during monitoring are verified with the radio signals associated with the components included in the register. The components are assembled into the electronic device (or partially assembled device). The radio signals corresponding to the available components are monitored to ensure the components were actually incorporated into the electronic device prior to proceeding with additional production.

In an additional aspect, a system for validating a manufacturing condition includes an information handling system configured for maintaining a register of available components. In an embodiment, a separate information handling system may be utilized to maintain a build-sheet register including data associated with a desired configuration to be manufactured. In other embodiments a single information handling system is configured to include both registers. A monitoring device such as a RFID transceiver is communicatively coupled to the information handling system so as to monitor for radio signals associated with the components included in the available component register. An alerting device is additionally communicatively coupled for notifying personnel of a non-conforming electronic device or component.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is a flow diagram illustrating manufacture of an electronic device implementing a method in accordance with an embodiment of the present invention;

FIG. 2 is a flow diagram illustrating a method for manufacturing a device including validating a manufacturing configuration in accordance with an embodiment of the present invention; and FIG. 3 is a flow diagram illustrating a method of manufacturing an electronic device including validating a manufacturing configuration in accordance with an embodiment of the present invention.

DETAILED DESCRIPTION OF THE INVENTION

Reference will now be made in detail to the presently preferred embodiments of the invention, examples of which are illustrated in the accompanying drawings.

Referring to FIGS. 1 and 2 a method 100 for manufacturing an electronic device including validating a manufacturing configuration is disclosed. The method 100 of the present embodiment permits validation of the electronic device components in an efficient manner so as to prevent an improper configuration assembly/identify an improperly configured at least partially assembled electronic device. The method 100 of the present invention is suited for utilization in the manufacture of a wide variety of electronic devices such as data storage devices, information handling systems, consumer electronic devices, and the like. The method 100 may be particularly advantageous for utilization in manufacturing build-to-order systems, semi-customized system, and the like electronic devices where multiple electronic device components and/or a wide variety of components are integrated into an electronic device. For instance, the present method may be utilized for validating electronic device configurations when a category of electronic device components have various functional capacities (e.g., data storage controllers having differing functionality, implement various communication protocols, hard drives having various storage capacities), or where multiple component options are available, and the like.

Initially, a register is generated 102 including a desired device configuration. For example, a register, such as an electronic data base, is generated with data corresponding to a device to be manufactured (i.e., a build-sheet of the various components to be included, or a subset thereof). A desired device configuration may reference a completed electronic device to be manufactured or a sub-set of components to be included in an electronic device to be manufactured. A build sheet register includes data related to the various components to be integrated into the completed electronic device (the electronic device to be assembled). The register may include data such as the part numbers of electronic device components, a description of the components (physical such that personnel may recognize the component, functional capabilities of the components (i.e. processor speed, storage capacity, and the like)), a radio signal associated with the particular type of component (e.g., a radio frequency identification device (RFID) including data referenced on the tag), product identification number, serial number, supplier information, batch data, and the like corresponding to at least one component to be included in the electronic device. For instance, a generated register, may be automatically generated 102 based on a website purchase by a customer based on the customer's desired configuration or a semi-customized configuration, entered by manufacturer personnel, or the like.

In an embodiment, the generated register 102 may include the part number and radio signal information associated with an RFID tag which is affixed (individually) to the devices of that type. For example, a passive RFID tag (a RFID which is read-only) may be adhered to component in order to permit identification. RFID tags may be utilized in instances where various types of components are available for integration (i.e., a variety of data storage controllers, various types of processor). Those of skill in the art will appreciate that the register may be stored in electronic format such as on a hard drive included in an information handling system which is communicatively coupled within an integrated manufacturing verification system or the like. The register may be provided to personnel such as employees retrieving components or employees assembling the components for inclusion in the electronic device. The register may be displayed on a dedicated workstation or the like as desired.

In the current embodiment, a radio signal associated with an electronic device component to be included in the electronic device, is monitored 104. Those of skill in the art will appreciate a plurality of radio signals may be monitored based on manufacturing conditions. For instance, a RFID receiver (transceiver) is located to identify electronic device components within an area such as a build cell based on a RFID transponder included in the RFID tag which is affixed to the electronic device component. In another example, several signals may be monitored to ensure the individual components (associated individually with a signal) match with the desired device configuration included in the register. Monitoring radio signals 104 permits subsequent verification 106 of the presence/absence of components corresponding to the desired device configuration included in the generated register 102. In the foregoing manner, the various components to be integrated (such as in a controller having a first RFID tag, a hard drive having a second RFID tag, a power supply having a third RFID tag) may be verified 106 prior to assembly into the electronic device/sub-assembly, thereby minimize the potential for inadvertent omission, or inclusion of a component within the electronic device prior to assembly into the electronic device. Verification 106 may include verifying data referenced in the monitored RFID tag to desired device configuration data included in the generated build-sheet register in order to validate the component being present in a particular location (i.e., a build cell). For example, the RFID transmitter/receiver is communicatively coupled to an information handling system containing the build sheet register.

Those of skill in the art will appreciate that an alert may be provided 108 based on the monitored radio signal 104. For instance, if a radio signal associated with the electronic device component included in the desired device configuration is not present an alert may be provided to personnel in order to prevent/minimize the time/expense associated with the inadvertent substitution of a non-conforming component of the same category as that of the desired component or the omission of the desired component. Suitable alerts include visual notifications (i.e., a flashing light), audible notifications (i.e., a buzzer), electronic notification (i.e., via paging system, a cellular telephone, email, an instant message), and the like. Those of skill in the art will appreciate that the notification device hardware may be communicatively coupled in an integrated manufacturing verification system including an information handing system for generating the register.

Upon verification 106, the various components are assembled 110 into an at least partially assembled electronic device. Verification may include comparing the detected/non-detected radio signals to the signals associated the components forming the desired device configuration included in the build-sheet register. For instance, the components to be added in a particular step are integrated into a chassis for containing the electronic device or the components may be integrated into a sub-assembly of the electronic device for subsequent integration.

In a further step, a radio signal associated with the electronic device component is again monitored 112 to ensure the correct component was integrated into the electronic device. Those of skill in the art will appreciate that a plurality of radio signals may be monitored as well, if several components are integrated. For example, radio signals associated with the components to be assembled in a particular assembly step or area of manufacturing facility. Monitoring 112 of the electronic device (or portion thereof) subsequent to assembly may ensure the included component corresponds to the desired device configuration prior to completion of the manufacturing process, or continued processing (the next stage).

If for instance, a component is omitted from the electronic device, an alert such as previously described with respect to step 108 may be provided for notifying personnel of the variation. Optionally, a verification step may be implemented to confirm the monitored electronic device includes the components included in the desired component configuration. For example, the electronic device may be disposed in a particular monitoring location (e.g., the build cell) to prevent a non-conforming device from continued assembly/processing. Those of skill in the art will appreciate that monitoring may be performed by the same hardware as implemented in step 104 or may implement additional hardware which is disposed in a second location such that the as-built configuration only includes those components physically included in the electronic device or partially assembled electronic device.

Referring now to FIG. 3, in a further aspect of the invention, a method 300 of manufacturing an electronic device is described. In the present embodiment, a register including available electronic device components is maintained 302. For instance, an available components register may include data based on the type of component (i.e., components having the same functional characteristics and the like). Maintaining a register of available components 302 prevents spurious addition of additional components, permits identification of a component not conforming to a desired configuration, and the like. For example, a register including all available the components may be maintained such that the components may be monitored at various steps. Alternatively, only pre-selected components may be included in the available component register such as components which may be easily confused by personnel, components corresponding to a category which has a large difference in expense between types of components in the category, components which are integrated in large numbers, and the like.

A build-sheet register including a desired device configuration is generated 304. The desired device configuration being selected from the available electronic device components. Those of skill in the art will appreciate that the build-sheet register may be generated 304 as a separate register from the register containing the available components, generated as a sub-register within the available components register, configured to interface with the available component register (such as to permit selection from the available component register or the like as contemplated by those of skill in the art). For instance, the build sheet register may include the part number associated with a component of a predefined type and a radio signal (i.e., RFID data) for identifying the component. Additional information related to components included in the desired device configuration may be included as well such as was described above with respect to the register generated in step 102.

Subsequently, radio signals associated with each type of component included in the available electronic components are monitored 306 in a substantially similar manner as described with respect to FIGS. 1 and 2. Preferably, monitoring occurs at a designated location, designated time, or the like, such as in a build cell prior to assembly so as to minimize the possibility of improper assembly. In the present embodiment, monitoring includes monitoring for the radio signals corresponding to the components maintained in the available component register 302.

An alert may be provided 308 based on the monitored radio signals 306. For instance, if a radio signal associated with the electronic device component included in the desired device configuration is not present an alert may be provided to personnel in order to prevent/minimize the time/expense associated with the inadvertent substitution of a non-conforming component of the same category as that of the desired component or the omission of the desired component. Further, components not included in the desired configuration may be identified as well to prevent a spurious addition, identify the additional component, and the like. Alerts may include visual notifications (i.e., a flashing light), audible notifications (i.e., a buzzer), electronic notification (i.e., via paging system, a cellular telephone, email, an instant message), and the like. Notification device hardware may be communicatively coupled in an integrated manufacturing verification system including an information handling system for generating the available component register and/or the build-sheet register.

The physical components are verified 310 for conformance with the desired configuration such as by validating the monitored radio signals to the radio signals corresponding to the desired configuration components in the build-sheet register. Verification may include comparing the detected/non-detected radio signals to the signals associated the components forming the desired device configuration included in the build-sheet register. The components are then assembled 312 into an at least partially assembled electronic device/electronic device sub-assembly.

Additionally, the radio signals associated with the components are again monitored 314 to ensure the correct components were integrated into the electronic device. For example, radio signals associated with the components which were to be assembled in a particular assembly step or build cell. Monitoring 316 of the electronic device (or portion thereof) subsequent to assembly may ensure the component corresponds to the desired device configuration prior to completion of the assembly process, or continued processing (the next stage).

If for instance, a component is omitted from the electronic device, an alert such as previously described with respect to steps 108, 308 may be provided for notifying personnel of the variation and/or addition of components not included in the desired device configuration. A verification step may be implemented as well to confirm the monitored electronic device contains the components from the build-list register. For example, the electronic device may be disposed in a monitoring location (e.g., a build cell) to prevent a non-conforming device (such as a device having an additional component) from continued assembly/processing. Those of skill in the art will appreciate that monitoring may be performed by the same hardware as implemented in step 306 or may implement additional hardware which is disposed in a second location such that the build configuration only includes those components physically included in the electronic device/the partially assembled electronic device.

Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for manufacturing an electronic device, comprising:
   generating a register including a desired device configuration corresponding to the electronic device to be manufactured, the desired device configuration having at least one electronic device component for integration into the electronic device and at least one radio signal associated with the at least one device component;
   monitoring for the at least one radio signal, the at least one electronic device component, associated with the at least one radio signal, being unassembled into the electronic device;
   verifying the monitored at least one radio signal corresponds to the at least one component included in the desired device configuration;
   assembling the at least one electronic device component into an at least partially assembled electronic device; and
   monitoring for the at least one radio signal, the at least one electronic device component, associated with the at least one radio signal, being integrated into the electronic device, wherein the electronic device is a data storage device.

2. The method for manufacturing an electronic device of claim 1, wherein the at least one electronic device component includes a radio frequency identification device (RFID).

3. The method for manufacturing an electronic device of claim 1, further comprising the step of providing an alert, if the at least one radio signal associated with the at least one electronic device component is not present during monitoring.

4. The method for manufacturing an electronic device of claim 3, wherein providing an alert is at least one of providing a visual notification, providing an audible notification, providing an email notification, or providing an electronic notification.

5. The method for manufacturing an electronic device of claim 3, wherein providing an alert is an electronic notification including a part number associated with the non-present component.

6. The method for manufacturing an electronic device of claim 1, further comprising the step of maintaining a register of available electronic device components.

7. The method for manufacturing an electronic device of claim 6, further comprising the step of determining if an additional component is included in the at least partially assembled electronic device based on at least one radio signal during monitoring.

8. The method for manufacturing an electronic device of claim 1, wherein the at least one electronic device component includes an adhered radio frequency identification device (RFID) tag.

9. The method for manufacturing an electronic device of claim 1, wherein the electronic device is a build-to-order electronic device.

10. The method for manufacturing an electronic device of claim 1, wherein the at least one electronic device component includes a passive radio frequency identification device (RFID).

11. A method of manufacturing an electronic device, comprising:
    maintaining a register of available electronic device components including a radio signal associated with each type of electronic device component included in the available electronic device components;
    generating a build-sheet register including a desired device configuration corresponding to the electronic device to be manufactured, the desired device configuration having at least one electronic device component for integration into the electronic device selected from the available electronic device components;
    monitoring for the radio signals associated with each type of electronic device component included in the available electronic device components;
    verifying the monitored radio signals correspond to the desired device configuration included in the build-sheet register;
    assembling the electronic device components corresponding to the desired device configuration included in the build-sheet register into an at least partially assembled electronic device; and
    monitoring the radio signals associated with each type of electronic device component included in the register of available electronic device components, the electronic device components being included in the at least partially assembled electronic device, wherein the electronic device is a data storage device.

12. The method of manufacturing an electronic device of claim 11, wherein individual components, included in the available electronic device components, includes a radio frequency identification device (RFID).

13. The method of manufacturing an electronic device of claim 11, further comprising the step of providing an alert, if the radio signals associated with the components included in the at least partially assembled electronic device do not correspond with the desired device configuration included in the build-sheet register.

14. The method of manufacturing an electronic device of claim 13, wherein providing an alert is at least one of providing a visual notification, providing an audible notification, providing an email notification, or providing an electronic notification.

15. The method of manufacturing an electronic device of claim 14, wherein providing an alert is an electronic notification including a part number associated with at least one of a non-present component or a spuriously included component.

16. The method of manufacturing an electronic device of claim 11, wherein individual components, included in the available electronic device components, includes an adhered radio frequency identification device (RFID) tag.

17. The method of manufacturing an electronic device of claim 11, wherein the electronic device is a build-to-order electronic device.

18. A method for manufacturing an electronic device, comprising:

generating a register including a desired device configuration corresponding to the electronic device to be manufactured, the desired device configuration having at least one electronic device component for integration into the electronic device and at least one radio signal associated with the at least one device component;

monitoring for the at least one radio signal, the at least one electronic device component, associated with the at least one radio signal, being unassembled into the electronic device;

verifying the monitored at least one radio signal corresponds to the at least one component included in the desired device configuration;

assembling the at least one electronic device component into an at least partially assembled electronic device;

monitoring for the at least one radio signal, the at least one electronic device component, associated with the at least one radio signal, being integrated into the electronic device, wherein the electronic device is a data storage device; and providing an alert, if the at least one radio signal associated with the at least one electronic device component is not present during monitoring.

19. A method for manufacturing an electronic device, comprising:

generating a register including a desired device configuration corresponding to the electronic device to be manufactured, the desired device configuration having at least one electronic device component for integration into the electronic device and at least one radio signal associated with the at least one device component;

monitoring for the at least one radio signal, the at least one electronic device component, associated with the at least one radio signal, being unassembled into the electronic device;

verifying the monitored at least one radio signal corresponds to the at least one component included in the desired device configuration;

assembling the at least one electronic device component into an at least partially assembled electronic device;

monitoring for the at least one radio signal, the at least one electronic device component, associated with the at least one radio signal, being integrated into the electronic device, wherein the electronic device is a data storage device; and determining if an additional component is included in the at least partially assembled electronic device based on at least one radio signal during monitoring.

20. A method of manufacturing an electronic device, comprising:

maintaining a register of available electronic device components including a radio signal associated with each type of electronic device component included in the available electronic device components;

generating a build-sheet register including a desired device configuration corresponding to the electronic device to be manufactured, the desired device configuration having at least one electronic device component for integration into the electronic device selected from the available electronic device components;

monitoring for the radio signals associated with each type of electronic device component included in the available electronic device components;

verifying the monitored radio signals correspond to the desired device configuration included in the build-sheet register;

assembling the electronic device components corresponding to the desired device configuration included in the build-sheet register into an at least partially assembled electronic device;

monitoring the radio signals associated with each type of electronic device component included in the register of available electronic device components, the electronic device components being included in the at least partially assembled electronic device; and providing an alert, if the radio signals associated with the components included in the at least partially assembled electronic device do not correspond with the desired device configuration included in the build-sheet register.

21. A method for manufacturing an electronic device, comprising:

generating a register including a desired device configuration corresponding to the electronic device to be manufactured, the desired device configuration having at least one electronic device component for integration into the electronic device and at least one radio signal associated with the at least one device component;

monitoring for the at least one radio signal, the at least one electronic device component, associated with the at least one radio signal, being unassembled into the electronic device;

verifying the monitored at least one radio signal corresponds to the at least one component included in the desired device configuration;

assembling the at least one electronic device component into an at least partially assembled electronic device; and monitoring for the at least one radio signal, the at least one electronic device component, associated with the at least one radio signal, being integrated into the electronic device, wherein the at least one electronic device component includes a at least one of a passive radio frequency identification device (RFID) or an adhered radio frequency identification device (RFID) tag.

* * * * *